United States Patent (10) Patent No.: US 6,752,020 B1
Sobotta et al. (45) Date of Patent: Jun. 22, 2004

(54) DEVICE FOR MEASURING PRESSURE, SOUND AND VIBRATION AND METHOD OF ANALYZING FLOW ON SURFACES OF STRUCTURAL PARTS

(75) Inventors: Gerald Sobotta, Sauerlach (DE); Dieter Bosch, Munich (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/979,160

(22) PCT Filed: May 10, 2000

(86) PCT No.: PCT/DE00/01468

§ 371 (c)(1), (2), (4) Date: Nov. 20, 2001

(87) PCT Pub. No.: WO00/71984

PCT Pub. Date: Nov. 30, 2000

(30) Foreign Application Priority Data

May 20, 1999 (DE) .......................... 199 23 087

(51) Int. Cl.⁷ .............................. G01L 11/00
(52) U.S. Cl. .................. 73/702; 73/861.42; 73/861.47
(58) Field of Search .............. 73/702, 147, 178 R–182, 73/861.42, 861.47; 244/195, 35, 201; 364/424.03

(56) References Cited

U.S. PATENT DOCUMENTS

| 4,063,049 A | 12/1977 | Pipitone et al. | |
| 4,188,823 A | 2/1980 | Hood | |
| 4,706,902 A | 11/1987 | Destuynder et al. | 244/76 C |
| 4,764,244 A | 8/1988 | Chitty et al. | |
| 4,770,032 A | 9/1988 | Plentovich et al. | 73/147 |
| 4,856,735 A * | 8/1989 | Lotz et al. | 244/35 R |
| 4,868,447 A | 9/1989 | Lee et al. | 310/328 |
| 5,457,630 A * | 10/1995 | Palmer | 701/3 |
| 5,740,991 A | 4/1998 | Gleine et al. | |
| 5,869,189 A | 2/1999 | Hagood, IV et al. | |
| 5,874,671 A | 2/1999 | Lopez | 73/147 |
| 5,918,834 A * | 7/1999 | Sommer et al. | 244/129.1 |

FOREIGN PATENT DOCUMENTS

| DE | 33 37 978 A1 | 10/1983 |
| DE | 37 29 409 C2 | 9/1987 |
| DE | 38 16 057 C1 | 5/1988 |
| DE | 29802640 U1 | 2/1998 |

OTHER PUBLICATIONS

PCT International Application PCT/SE94/00049, Deicing Means Device, Jan. 25, 1994, PCT International Search Report, Abstract & p. 3.*
"Shock detection by means of piezofoils", W. Nitsche et al; Z. Flugwiss. Weltraumforsch. 15 (1999) 223–226.
PCT International Search Report and translation of relevant portions thereof.
Ulrich Rembold, et al., "Methoden der Kuenstilichen Intelligenz in der industriellen Fertigung" Technische Rundschau, vol. 13, 1992 Part 1.
Ulrich Rembold, et al., "Methoden der Kuenstilichen Intelligenz in der industriellen Fertigung" Technische Rundschau, vol. 13, 1992 Part 2.
Ulrich Rembold, et al., "Methoden der Kuenstilichen Intelligenz in der industriellen Fertigung" Technische Rundschau, vol. 13, 1992 Part 3.
"Duennhaeutige Sensoren auf dem Hoehenflug" Forschung und Technik, Aug. 1990.

* cited by examiner

Primary Examiner—Edward Lefkowitz
Assistant Examiner—Jermaine Jenkins
(74) Attorney, Agent, or Firm—Crowell & Moring LLP

(57) ABSTRACT

In a method and apparatus for measuring pressure, sound and vibration, particularly for the flow analysis on missiles or airplanes, a sensor device which is used to sense pressure or sound waves, is linked to a structure of a structural part in order to measure forces acting upon the structural part surface. The sensor device is arranged completely inside the structure of the structural part or on the rear side of the structural part surface. In particular, the sensor device may comprise a piezoelectric foil which is situated under the structural part surface.

11 Claims, 8 Drawing Sheets

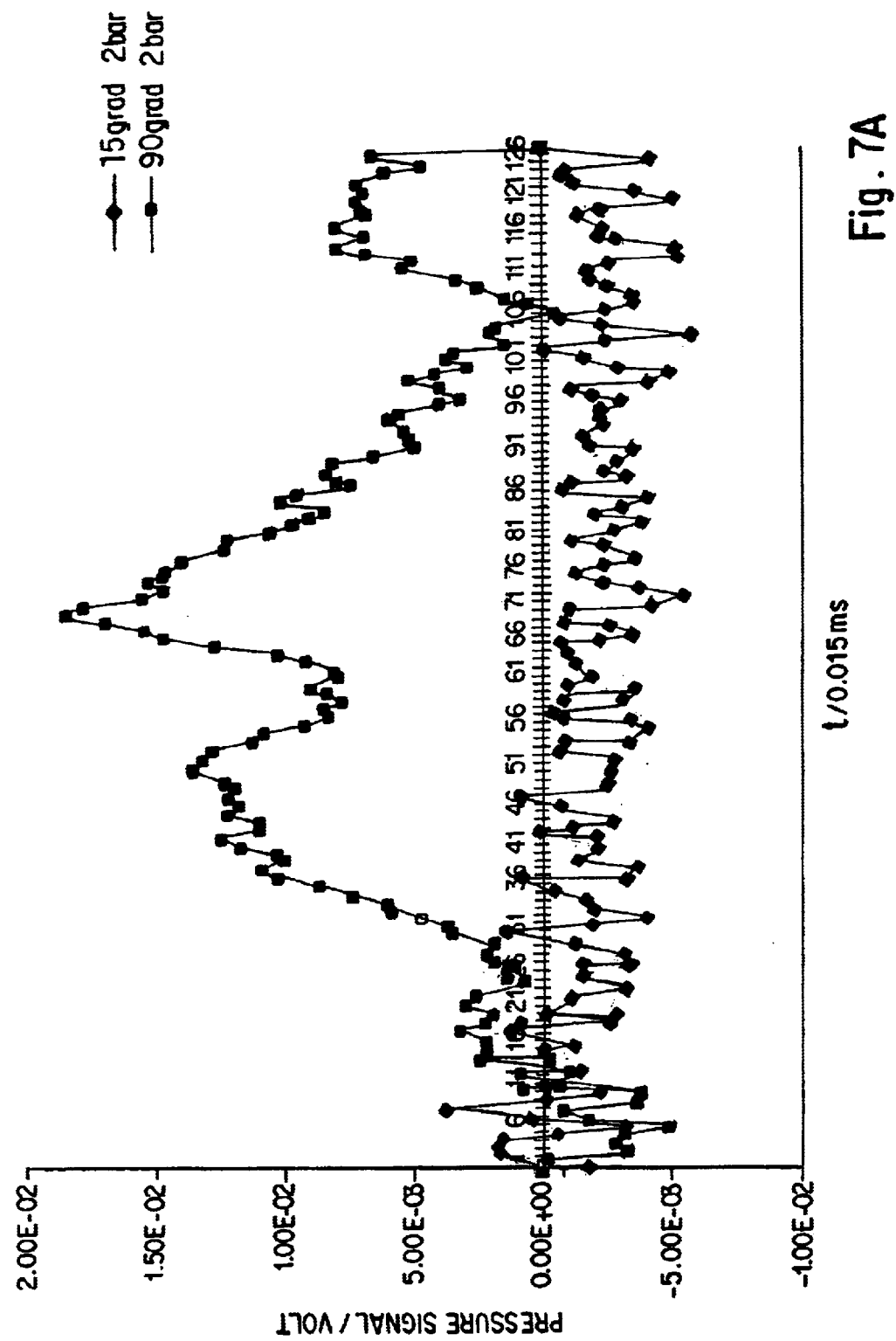

DEVICE FOR MEASURING PRESSURE, SOUND AND VIBRATION AND METHOD OF ANALYZING FLOW ON SURFACES OF STRUCTURAL PARTS

This application claims the priority of PCT document PCT/DE00/01468 filed May 10, 2000 and German patent document 199 23 087.0 filed May 20, 1999, the disclosures of which are expressly incorporated by reference herein.

BACKGROUND AND SUMMARY OF THE INVENTION

The present invention relates to a method and apparatus for measuring pressure, sound or vibration, especially with regard to analyzing fluid flow on missiles, as well as to a method of analyzing the flow on surfaces of structural parts of missiles and in the field of aviation.

The characterization of fluid flows on surfaces of structural parts has become increasingly important in various fields of technology. Particularly for airplane wings, knowledge of the flow characteristics permits optimization of the wing shape for particular usage conditions. As a result, flying characteristics can be improved, and fuel requirements reduced.

In addition, in other fields of technology, fluidic measuring methods are required in order to improve aerodynamics. For example, in automotive engineering, fuel consumption can be reduced by optimizing the shapes of structural parts, for example, in the area of the intake train.

In order to measure flow characteristics at wings of airplanes, piezoelectric pressure foils and membrane pressure sensors have been mounted on the wing surface, for example in the lab or in a wind tunnel. The article "Shock Detection by Means of Piezofoils", W. Nitsche et al., Zeitschrift für Flugwissenschaften und Weltraumforschung 15(1991), Pages 223–226, Springer Publishers, discloses a measuring method for detecting compression shocks on flow bodies. In this case, a sensor array, in the form of a thin piezoelectric foil, is mounted on the body to be tested, and used to detect the unsteady fluctuations of pressure, shearing stress and temperature and thereby supply information on the position of compression shocks.

The piezofoil is mounted on a wing, and the flow-induced local pressure fluctuations are measured. As a result, characteristic RMS values are determined by way of the wing profile in order to determine the position of the compression shock or the shock position. However, known systems of this type have the disadvantage that the sensors are exposed to high stress, particularly due to the effects of dirt and ice, which may impair the measuring results, and even destroy the sensors. Furthermore, as a result of an interaction with the flowing medium, the sensors change the original flow and therefore corrupt the measuring results. As an additional fact, high-expenditure production and maintenance work is required. The sensors glued onto the component surface are therefore susceptible to various types of damage (for example, because of dirt, impact of birds, etc.), and require high expenditures for production and maintenance.

It is therefore an object of the present invention to provide a device for measuring pressure, sound and/or vibration which is robust and cost-effective.

Another object of the invention is to provide such a measurement device which is suitable for an operational usage or for a series, and supplies the exact measuring result while the service life is long.

Furthermore, still another object of the invention is to provide a method of analyzing the flow on surfaces of structural parts which is particularly suitable for applications in aviation.

Finally, yet another object of the invention is to provide such a method by means of which, in operational usage, the flow characteristics can be determined on the structure of a structural part.

These and other objects and advantages are achieved by the method and apparatus according to the invention for measuring pressure, sound and/or vibration, which comprises a sensor device for sensing pressure waves or sound waves which is linked to a structure of a part in order to measure forces acting upon the surface of the structural part. The sensor device is arranged completely within the structure of the part or on the rear side of the surface of the structural part, so that the device is protected against damage also under extreme stress, as, for example, when used on the wings of airplanes, and the service life is increased.

Advantageously, the device also comprises a unit for analyzing signals by means of artificial intelligence methods, so that it is possible to determine with high accuracy the flow characteristics, based on measured values detected below the surface of the structure of the part. The sensor device preferably comprises a plurality of pressure sensors which are arranged below or on the rear side of a shell of the structure of the part. The sensor device may, for example, be a piezoelectric foil which is fixedly connected with the interior side of the outer wall of the structure of the part. In particular, the structure of the structural part may be a wing of a missile, in which case the sensor device is arranged, for example, below the wing shell in a wing area.

Data lines and/or supply lines of the sensor device may be arranged or integrated completely in the structure of the part. In this manner, the lines can have no influence on the actual flow, so that more precise measuring results can be achieved. In addition, the reliability of the measured value detection is increased because the lines are protected from damage.

The device is advantageously designed such that frequencies of 250 KHz or less are used to characterize the flow on the surface of the structural part, particularly for detecting the start of turbulence, the position of a compression jolt, buffeting, and/or local surface friction. Thus, local flow characteristics can also be detected with high precision by the surface material, in which case lateral disturbances are suppressed by exponentially decreasing structure-borne noise in the structure material.

Metals or plastic materials, such as aluminum, steel or CFK are preferably used as surface material. When the thickness of the material is no greater than 5 mm, no special electronic amplifiers are required in order to receive signals suitable for the processing.

Advantageously, the device is a sensor module which is further developed as a component of the structure of the structural part. As a result of the modular installation without any modification of the surface exposed to the flowing medium, a cost-effective production is achieved and the maintenance possibilities are improved.

The device can also be utilized advantageously in a space segment whose temperature can be adjusted, or which can be heated or cooled and which can, for example, be insulated. As a result, a reliable and durable detection of the measured values without any failures can also be achieved at very low outside temperatures, for example, at −50° C. at an altitude of 10 km. The measuring module itself as well as mechanical interfaces (for example, adhesive substances) are protected in this manner from damage by material fatigue because of temperature fluctuations.

The method according to the invention for analyzing the flow on surfaces of structural parts is particularly suitable for applications in aviation. In this case, pressure, sound and/or vibrations are measured at an inside surface of the structure of a part, and artificial intelligence is used to determine at least one of the parameters turbulence start, compression shock, buffeting, and local surface friction. As a result of the special analyzing method by means of artificial intelligence, all information of the measured data series are used, including a supposed noise, in order to determine the flow characteristics. In this manner, increased precision is achieved without requiring preprocessing steps for eliminating systemic disturbances.

The method according to the invention also comprises filtering processes for the preprocessing of signals, for the extraction of characteristics, and/or classification methods.

Other objects, advantages and novel features of the present invention will become apparent from the following detailed description of the invention when considered in conjunction with the accompanying drawings.

BRIEF DESCRIPTION OF THE DRAWINGS

FIG. 1b is an enlarged cutout of the sensor module of FIG. 1a;

FIGS. 7a–c are graphic depictions of signal sequences recorded using the apparatus according to the invention.

DETAILED DESCRIPTION OF THE DRAWINGS

Figure 1A:
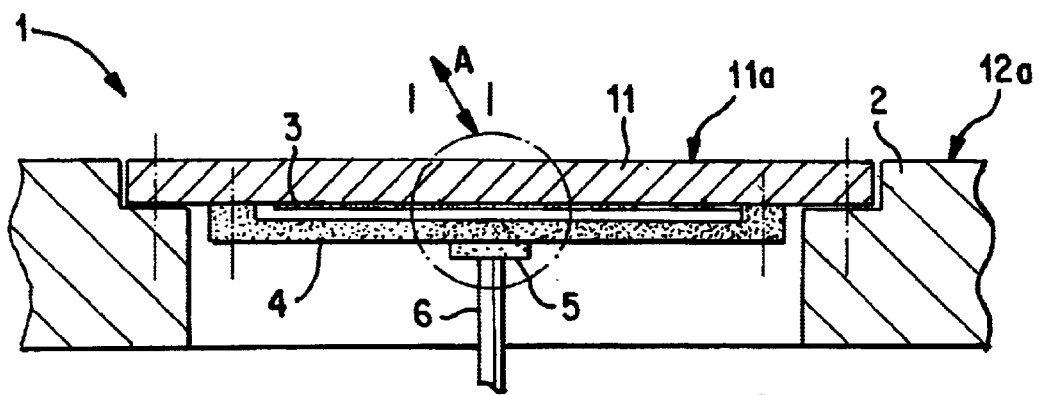
FIG. 1a is a view of a sensor module which is constructed as part of a wing structure and represents a preferred embodiment of the invention.

FIG. 1a shows a preferred embodiment of the invention, in which a sensor module 1 is integrated in a wing structure 2. The sensor module 1 consists of a shell or wing shell whose surface 11a forms a portion of the outer surface of the wing or of the wing structure 2 and closes off flush with the surface 12a of the adjoining areas of the wing structure. In the flying operation or when the flow is directed against the wing, the entire surface 11a, 12a of the structural part is exposed to the flow and to the forces resulting therefrom.

Below the wing shell 11, a PVDF foil sensor 3 is arranged as the actual sensor device and is fixedly connected with the wing shell 11. The foil sensor 3 is made of a polymer film and has a piezoelectric effect. (Such foil sensors are known and are described, for example, in U.S. Pat. No. 4,868,447 to which explicit reference is made here.) The PVDF sensor measures expansion movements, pressure or sound waves which act upon the wing structure 2 because of the flow and propagate by way of the wing shell 11. The outer layer of the sensor module 1, that is, the wing shell 11 in the area above the PVDF foil sensor 3, carries an amplifier plate bar 4. Below the amplifier plate bar 4, a connector 5 is mounted from which data and supply lines 6 extend inside the wing structure 2 to the electronic or analyzing units.

Figure 1B:
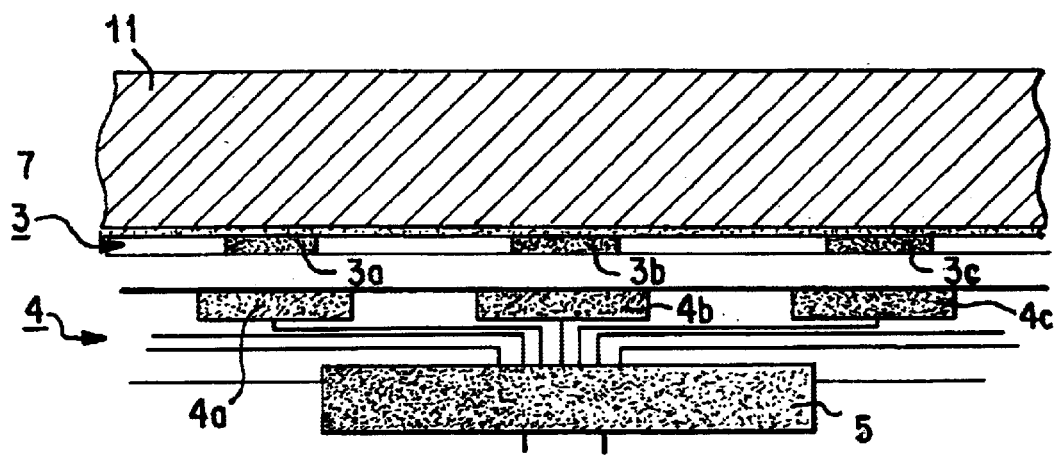

FIG. 1b is an enlarged broken away view of the area A in FIG. 1a. It is illustrated that the PVDF foil sensor 3 is firmly connected with the wing shell 11 by means of an adhesive layer 7. The foil sensor 3 has an arrangement of sensors 3a, 3b, 3c which are distributed in a laminar manner under the wing shell 11, that is, on its rear side. Directly under the foil sensor 3, the amplifier plate bar 4 with the electronic contructional elements 4a, 4b, 4c is situated which are electrically connected with the connector 5 situated directly underneath. As a result of the vertical construction of the wing shell, the foil sensor, the amplifier plate bar and the connector, particularly short paths are obtained for the lines and thus a low susceptibility to interferences is achieved.

By way of the connector 5, the entire sensor module 1 is electrically connected with additional units or with the analyzing unit and can therefore easily be exchanged. The sensor module 1 is an integral component of the wing structure 2, no sensor elements or lines being present on the outer surface 11a, 12a of the structure 2 of the structural part or wing.

The wing shell 11 in the area of the sensor module 1 has a thickness of from 2 to 3 mm, while, in the embodiment illustrated here, the wing structure has a thickness of approximately 5 mm. However, depending on the application, other sizes are also conceivable.

Figure 1C:
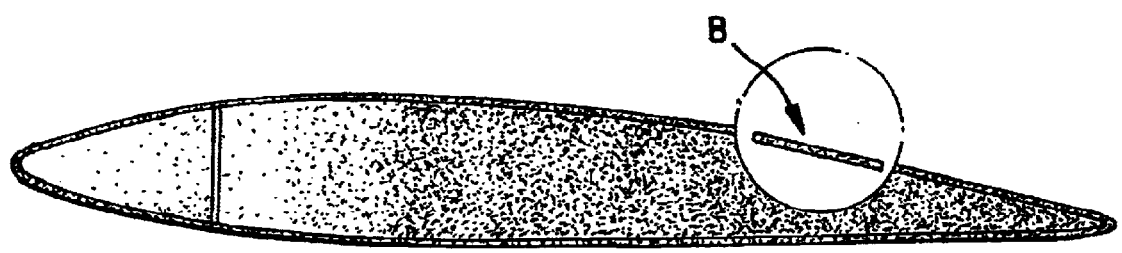
FIG. 1c is a view of the position of the sensor module in a wing.

FIG. 1c is a cross-sectional view of a wing of an airplane which, in an area B, has a sensor module 1 according to the invention, as described above with reference to FIG. 1a.

Figure 2:
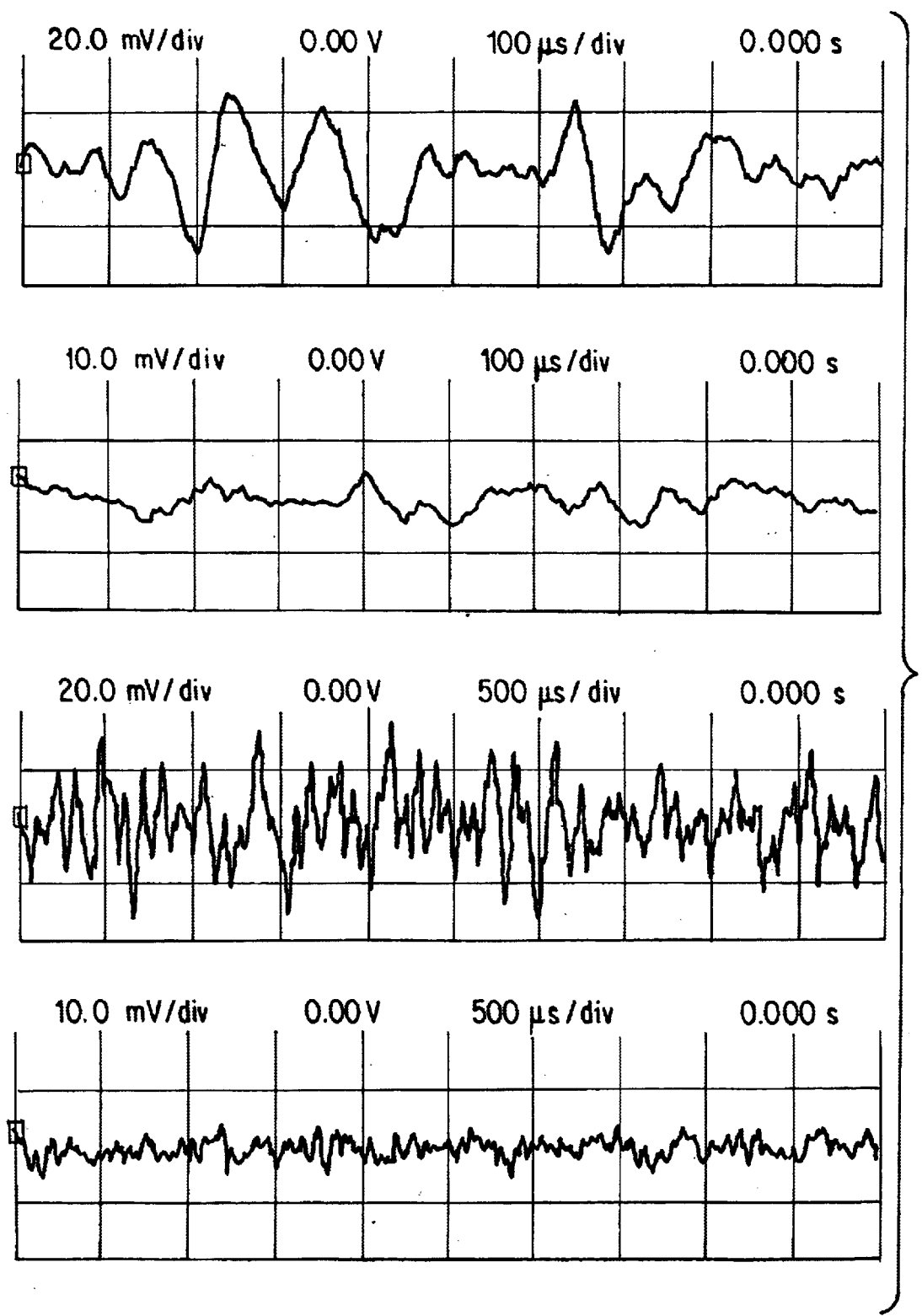
FIG. 2 is a graph which shows measured-value signals which were received by piezofoils, the oncoming flow taking place from the forward side of the foil carrier, on the one hand, and from the rearward side of the foil carrier, on the other hand.

FIG. 2 shows piezofoil signals which were determined in flow tests on surfaces of structural parts. In this case, a foil carrier made of carbon-fiber-reinforced plastic of a thickness of 2 mm was provided with a piezoelectric foil, and a flow against it took place from the forward side (upper series of measurements) and from the rearward side (lower series of measurements) respectively. (The series of measurements on the left and the right differ because of different time scales.) The measuring signals were determined at a certain point of the foil carrier over the time. It is illustrated that, when a flow takes place against the forward side (that is, the side on which the foil is mounted), significant higher amplitude fluctuations exist than when the flow takes place against the rear side, that is, the side which carries no foil.

Figure 3:
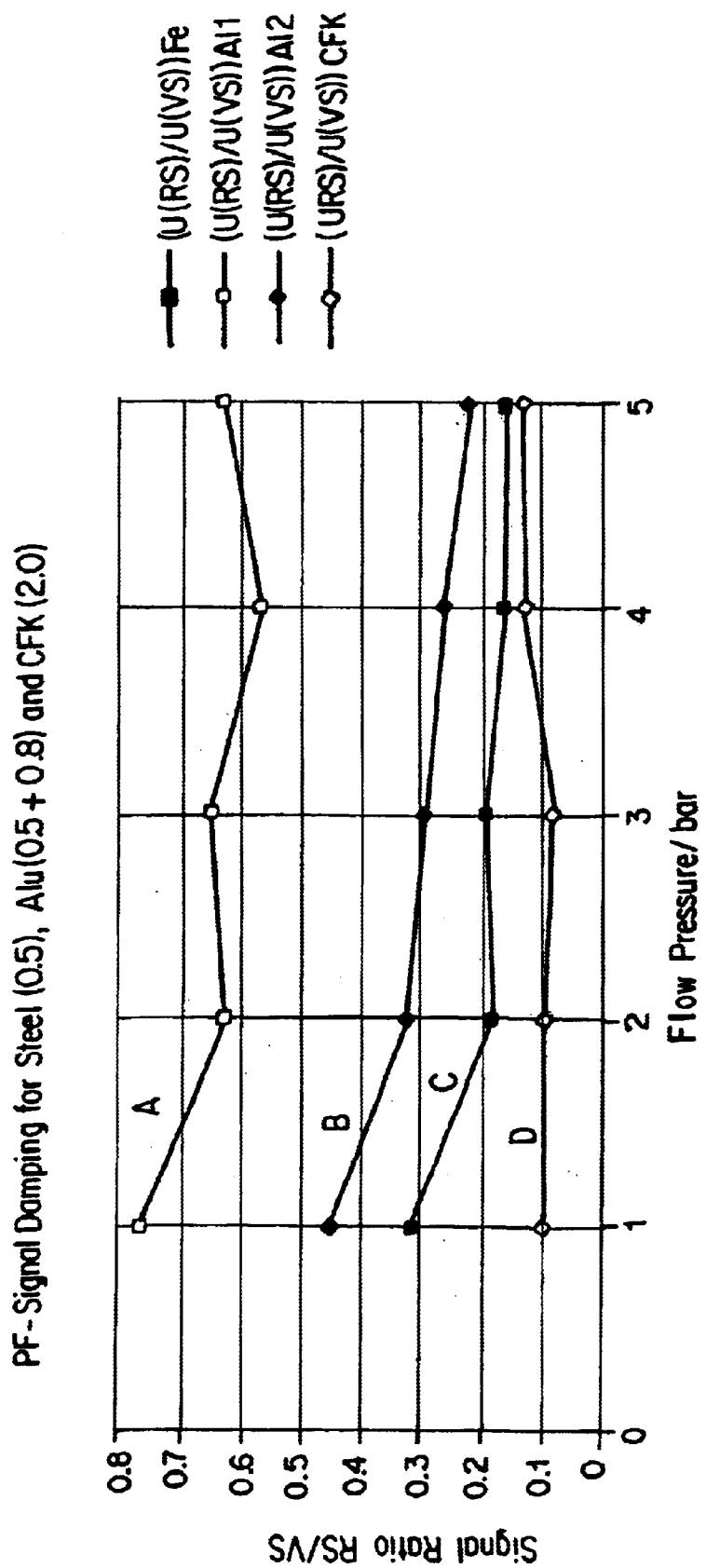
FIG. 3 is a diagram of the PF-signal damping by steel, aluminum and carbon-fiber-reinforced plastic, in which the signal ratio RS/VS with respect to the flow pressure is listed in bar.

FIG. 3 is a diagram which shows the signal ratio RS/VS entered as a function of the flow pressure in bar for various materials used as foil carriers. The individual curves are assigned to the different materials as follows: A: aluminum, thickness 0.5 mm; B: aluminum, thickness 0.8 mm; C: steel, thickness 0.5 mm; D: carbon-fiber-reinforced plastic, thickness 2.0 mm.

Figure 4:
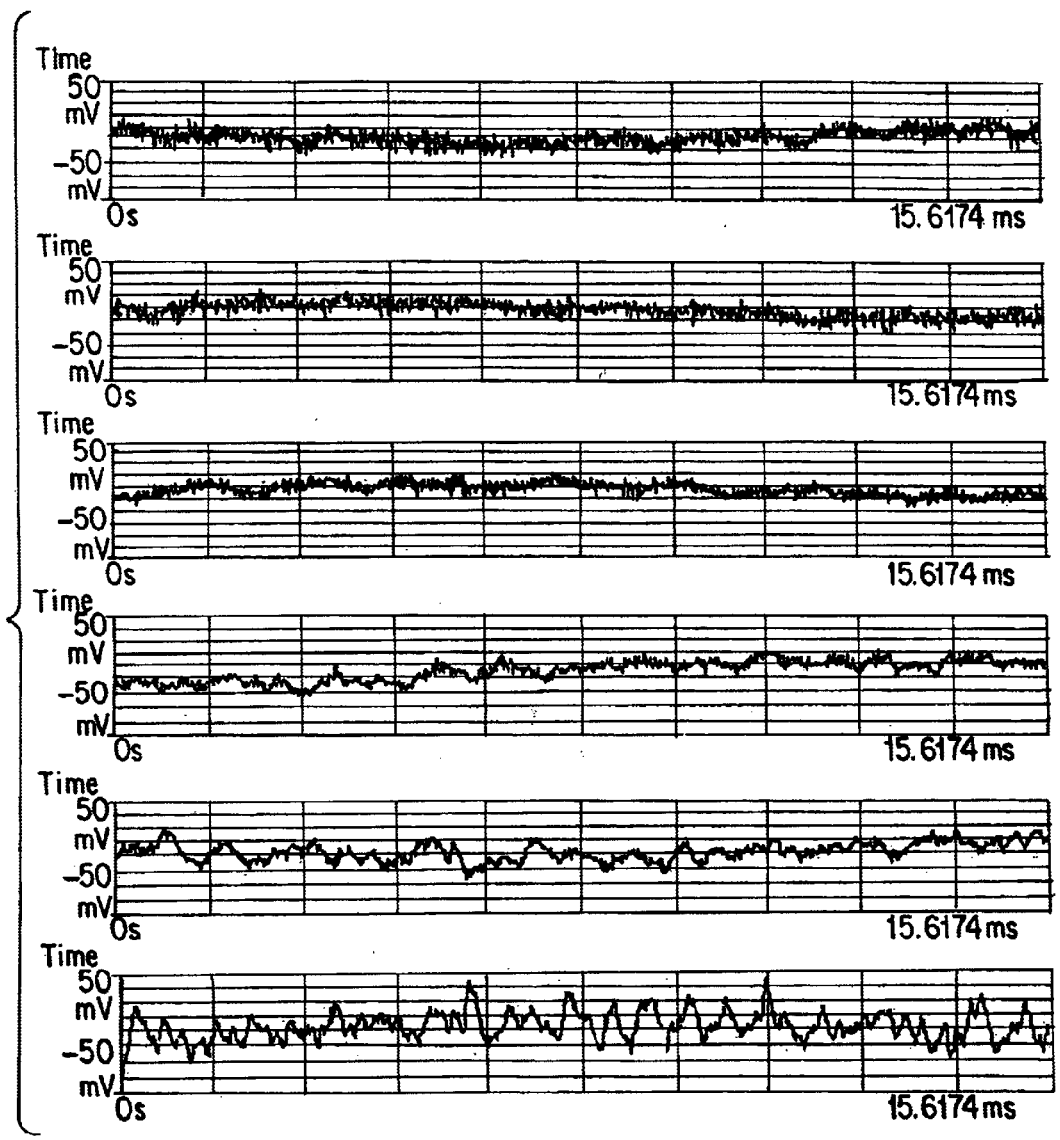
FIG. 4 is a graph of piezofoil signals during the transition from a laminar to a turbulent flow when the oncoming-flow angle is varied.

FIG. 4 shows piezofoil signals during the transition from a laminar to a turbulent flow when the oncoming-flow angle is varied. These series of measurements were determined by testing. In this case, the pressure amounted to 5 bar and the oncoming-flow angle for the rows of measurements in the sequence from above in the downward direction amounted to 15°, 30°, 45°, 60°, 75° and 90°. It is shown that, during the transition from a laminar to a turbulent flow, a clearly different wave form occurs. While, in the case of an oncoming-flow angle between 15° and 45°, the series of measurements has a smooth course, that is with a relatively small low-frequency fraction, in the case of an oncoming-flow angle of 60° and above, a clear low-frequency fraction of pressure fluctuations can be seen.

Figure 5:
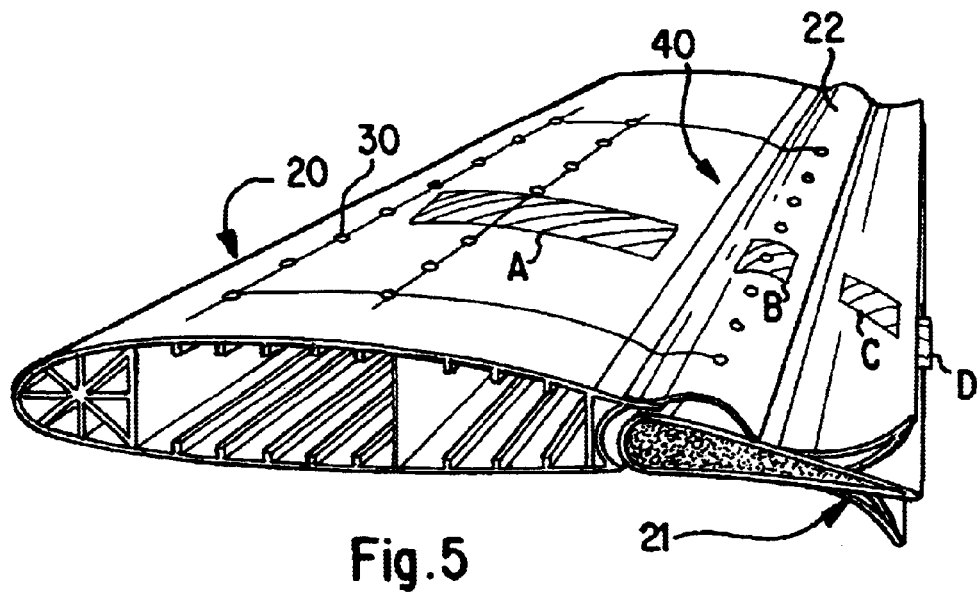
FIG. 5 is a perspective partial view of a wing with a sensor arrangement.

FIG. 5 is a perspective sectional view of a wing 20 of an airplane, which is provided with a sensor arrangement 30 for determining the flow characteristics. The sensor arrangement 30 consists of a network of sensors which are situated under the wing shell and are indicated in FIG. 5 for illustrating their position. The shape of the wing illustrated here can be changed in order to achieve optimal flow conditions on its surface. In its rearward end section, the wing has a variable curvature 21 or a flexible Fowler flap. Adjacent thereto, in the direction of the center of the wing, a local profile thickening 22 or a spoiler bump is situated which can also be adjusted. The profile thickening 22 adjoins the central area 40 of the wing. In order to determine the flow characteristics, pressure measurements are carried out in different areas of the wing which are schematically illustrated by the hatched surfaces A, B, D, C. By measuring the pressure waves or sound waves in the central area 40 of the wing (measured surface A), it is possible to determine a transition. As a result, it can be shown at which point in the wing profile the turbulence starts. The measured range B in the area of the profile thickening 22 permits a determination of the compression shock and of the buffeting (that is, of the shock vibration). The measured area C, which is situated in the range of the variable curvature 21, permits a localization of the buffeting, that is, of the separation, and the measured area D at the rearward end edge of the wing supplies information on the trailing edge pressure.

Figure 6A:
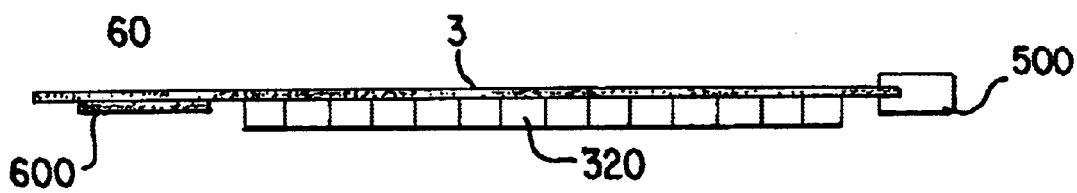
FIGS. 6A and 6B are a top view and a longitudinal sectional view respectively of a sensor—actuator module.
Figure 6B:
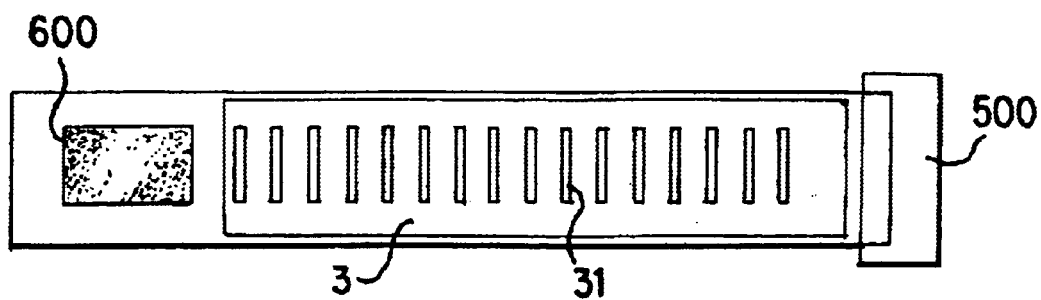

FIG. 6 illustrates a sensor—actuator module for basic piezofoil tests. The foil 3 has a total surface of 150×30 mm and is equipped with 16 sensor areas 31. Below the piezofoil 3, the charge amplifiers 320 are situated which are part of the sensor areas 31. A connector 500 is used for the electric supply or for transmitting the measuring signals. A piezo-actuator 600 is coupled to the piezofoil 3.

As a result of the mounting of the piezofoil under the surface of the structural part, as suggested in the present invention, the measuring arrangement is protected from dirt, rain, snow ice and temperature influences. Damage or even a detachment of the foil is avoided, and an easy installation is possible, without the requirement of complicated wiring or electric amplifiers. As a result of the device, the turbulence start or transition, the compression shock, the buffeting and the local surface friction are detected in the case of the flow characterization. These measuring tasks can be carried out by means of the arrangement of the sensor device according to the invention inside the structure of the part or on the rear side of the surface of the structural part. For this purpose, frequencies of up to 250 kHz are utilized, permitting detection of local flow characteristics through the surface material. Lateral disturbances are suppressed by the exponentially decreasing structure-born sound. In other words, at high frequencies in the ultrasound range, an imaging propagation takes place rather than wave propagation. As a result of high scanning frequencies, in combination with a suitable signal processing, a complete elimination of the low-frequency natural vibrations of the structure is achieved. In addition, by means of the sensor fields according to the present invention, propagation time measurements also of non-linear pressure and density modulations of the flow can be carried out by way of the structure-borne sound, as, for example, the movement of a shock wave front.

For implementation of the present invention, praxis-relevant surface materials, such as aluminum, steel or carbon fiber composites, were used in lab tests. Up to a material thickness of approximately 5 mm, no special electronic amplifiers are required in order to receive signals suitable for a further processing. Of course, all material of a suitable strength, such as metals or plastics, can be used.

Advantageously, various active and passive methods can be utilized for generating the structure-borne sound, on the one hand, in the case of pressure fluctuations by normal forces with respect to the surface and, on the other hand, by way of the surface friction as a result of shearing forces.

Since, according to the present invention, the surface of the structural part exposed to the flow is not occupied by a sensor device or sensor foil, additional advantageous possibilities are created, for example, active control by actuator-type local surface deformations, miniflaps, minislots, etc. Passive control can also be achieved isotropically, for example, by a defined roughness, as well as anisotropic effects by means of holes, grooves, etc. As a result, competing effects can be separated relative to the signals, thus, for example, direction-dependent flow characteristics.

By the selection of the material and its installation, the forming structure-borne sound signal can be influenced, for example, by sound insulation measures with respect to disturbances which are caused, for example, by motors, engines, etc.

The present invention is implemented as a sensor module or sensor electronic module in a particularly preferred embodiment on a plate bar without a spatial separation by the surface material. In another variant, the temperature of the measuring module and the mechanical interface (that is, the adhesive substance) can be adjusted by a displacement in a space segment which can be insulated, that is, can be heated or cooled. As a result, damage is avoided by extreme temperature conditions or fluctuations.

Furthermore, an installation technique can be used without surface intervention, and complete prefabrication and testing of the device can be carried out before installation. As a result, maintenance expenditures are significantly reduced.

In the following, the signal processing method will be discussed in a supplementary fashion. It comprises filtering methods for the signal preprocessing, the extraction of characteristics and classification methods. By using artificial intelligence methods, considerably improved analysis results can be achieved. This statement incorporates no detailed knowledge of fluid physics. The known analysis of RMS values is not sufficient at high limit frequencies. On the contrary, preprocessing steps are required for eliminating systemic disturbances, mainly of low-frequency signal fractions in order to increase the detection probability of weak effects.

For regulated systems, the present invention permits an early warning with respect to effects which can then be avoided by means of actuators. This is required, for example, for monitoring the buffeting. Because buffeting is caused by separation of the laminar flow by way of macroscopic bubbles an early warning can be provided by way of high-frequency signal fractions which occur from microscopic flow fluctuations before the macroscopic fluctuations leading to the separation. Since buffeting occurs in a localized manner, in the present invention, the characteristics are extracted from spatial and time-related signal correlations. Corresponding to the statement of the artificial intelligence, the necessary algorithm is determined by the needs of the individual case, and learning samples for the respective special application result in an optimal set of parameters. In the simplest case, these parameters are threshold values which must be exceeded in order to consider an effect as being detected.

The invention permits a systematic analysis with the possibility of a prediction of individual effects, which is achieved particularly by the use of artificial intelligence in the analyzing process.

The invention has mainly been described by means of applications in aviation. However, there are also other usage possibilities, for example, in automotive engineering, in which similar fluidic measuring methods are required. Here, the aerodynamics of a vehicle are an important field of application. Another important field is engine technology.

Figure 7B:
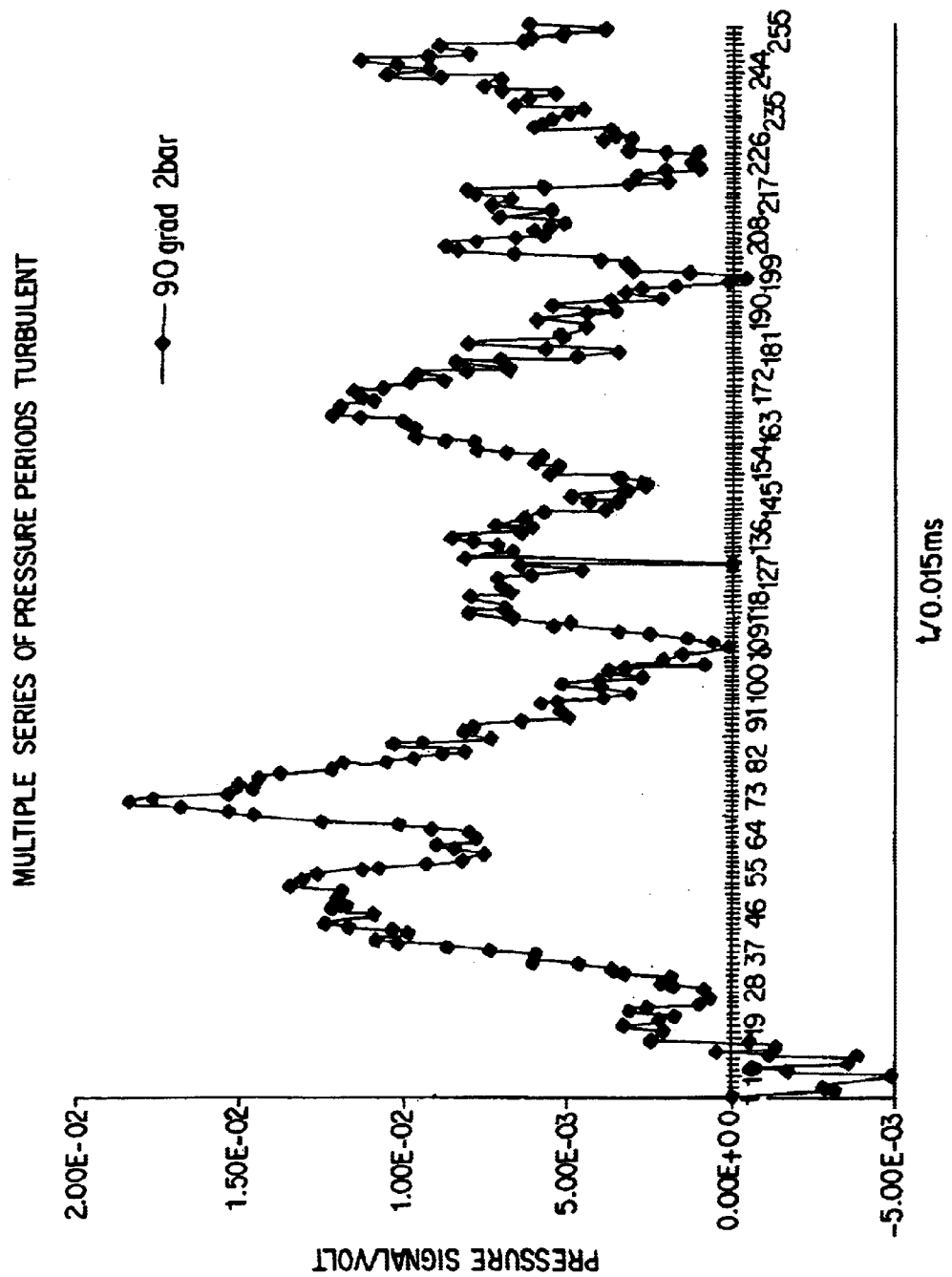
Figure 7C:
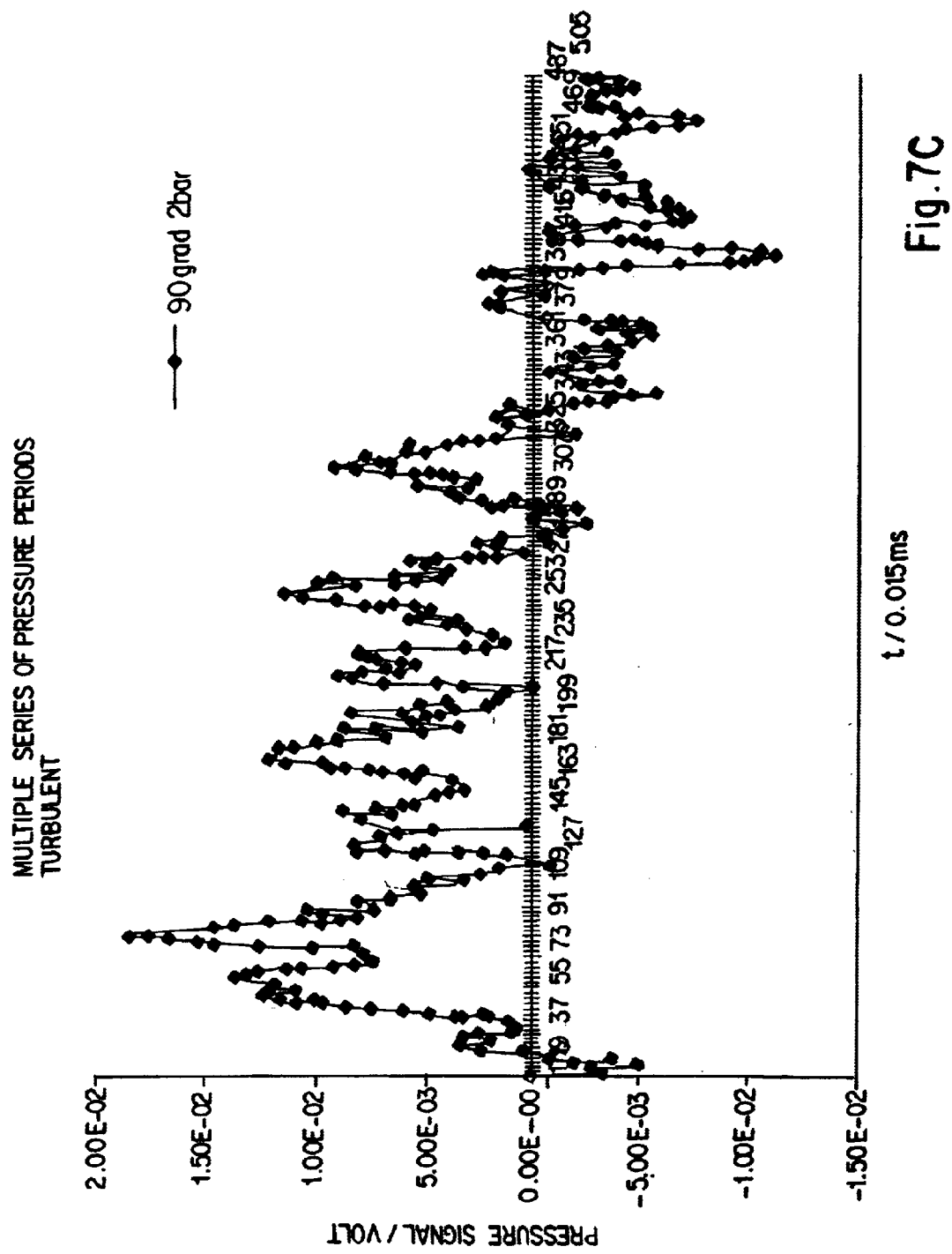

FIGS. 7a, 7b and 7c show various signal sequences which were recorded by means of the device according to the invention. The pressure signal is in each case listed in volts versus the time t listed in milliseconds.

FIG. 7a is a diagram with 128 measuring points, the upper curve reflecting an oncoming-flow angle of 90° and illustrating a turbulent flow, while the lower curve was recorded at an oncoming-flow angle of 15° and illustrates a laminar flow.

FIG. 7b is another diagram for a turbulent flow with 256 measuring points and FIG. 7c is another diagram with 512 measuring points.

The chaotic signal sequence, which is illustrated in FIG. 7c and its first half in the diagram of FIG. 7b for the turbulent flow contains the characteristics required for the classification. The diagram illustrated in FIG. 7a contains a comparison with the corresponding laminar flow for the first 256 measuring points. In this case, it is illustrated that the following discriminating characteristics are decisive:

a) larger amplitude differences b) larger average fluctuations c) occurrence of broad local peaks and double peaks which are not periodic.

Because of its invariability with respect to damping and noise, the last characteristic (characteristic c) is particularly suitable for the differentiation. The extraction of characteristics is carried out by the correlation with one or several previously learned testing patterns.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for determining fluid flow characteristics on structural part surfaces, said apparatus comprising a sensor device for sensing pressure or sound waves, which sensor device is linked to a structure of a structural part for measuring forces acting upon the surface of the structural part, wherein:

the sensor device is mounted with an interior side of an outer wall of the structural part;

the sensor device is arranged completely beneath the surface of the structural part in order to detect said fluid flow characteristics by measurement of pressure or sound waves propagated through the surface material of the structural part; and the sensor device comprises one of a piezoelectric foil and a foil sensor.

2. The device according to claim 1, further comprising an analysis unit for analyzing signals by means of artificial intelligence methods.

3. The device according to claim 1, wherein:

the sensor device comprises a plurality of pressure sensors which are arranged on an interior side of a shell of the structural part, which shell forms an outer wall of the structural part.

4. The device according to claim 1, wherein:

the structural part comprises a wing of a missile; and the sensor device is arranged beneath a shell of a wing area.

5. The device according to claim 1, wherein at least one of data lines and supply lines of the sensor device are arranged completely within the structural part.

6. The device according to claim 1, wherein frequencies lower than or equal to 250 kHz are analyzed for flow characterization on the structural part surface, to detect occurrence of an event selected from the group consisting of turbulence start, compression shock, buffeting and local surface friction.

7. The device according claim 1, wherein:

the surface material comprises a material selected from the group consisting of aluminum, steel and carbon-fiber-reinforced plastic material; and thickness of the surface material is no greater than 5 mm.

8. The device according to claim 1, wherein the sensor device comprises a module that is a component of the structure of the structural part.

9. The device according to claim 1, wherein the sensor device is arranged in a space segment whose temperature can be adjusted.

10. A method of analyzing fluid flow on structural part surfaces, comprising:

measuring a parameter selected from the group consisting of pressure, sound and vibration on an interior surface of the structural part and generating measurement signals indicative thereof; and determining at least one parameter selected from the group consisting of turbulence start, compression shock, buffeting and local surface friction based on measured signals, by means of artificial intelligence.

11. The method according to claim 10, further comprising:

using filtering methods for performing at least one function selected from the group consisting of preprocessing of signals, extraction of said fluid flow characteristics and classification of said fluid flow characteristics.

* * * * *